Figure 1:
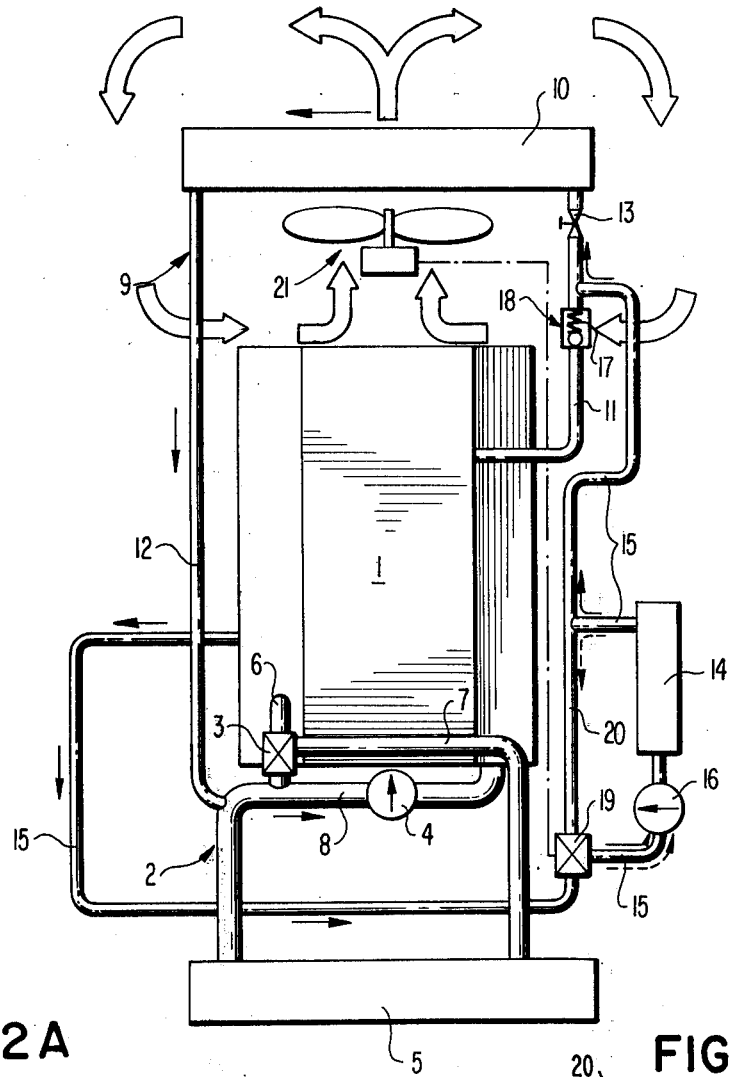

United States Patent [19]

Baier

[11] 4,018,380

[45] Apr. 19, 1977

[54] HEATER FOR VEHICLES

[75] Inventor: Kurt Baier, Sindelfingen, Germany

[73] Assignee: Daimler-Benz Aktiengesellschaft, Germany

[22] Filed: Nov. 13, 1974

[21] Appl. No.: 523,413

[30] Foreign Application Priority Data

Nov. 17, 1973 Germany .......................... 2357497

[52] U.S. Cl. ......................................... 237/12.3 C
[51] Int. Cl.² ............................................... B60H 1/02
[58] Field of Search .................. 237/12.3 B, 12.3 C

[56] References Cited

UNITED STATES PATENTS

| | | | |
|---|---|---|---|
| 2,057,128 | 10/1936 | Anestman | 237/12.3 B |
| 2,243,609 | 5/1941 | Spackman | 237/12.3 C |
| 2,270,824 | 1/1942 | Meyerhoefer | 237/12.3 B X |
| 2,726,042 | 12/1955 | Baier et al. | 237/12.3 C |
| 2,749,050 | 6/1956 | Booth | 237/12.3 B |
| 3,211,374 | 10/1965 | Matulaetis | 237/12.3 B X |
| 3,758,031 | 9/1973 | Moran | 237/12.3 C X |

Primary Examiner—William E. Wayner
Assistant Examiner—William E. Tapolcai, Jr.
Attorney, Agent, or Firm—Craig & Antonelli

[57] ABSTRACT

A standstill heating system for vehicles, especially for motor vehicles with a liquid-cooled internal combustion engine and with a controllable heater circulation equipped with at least one heat-exchanger, through which flows air intended to be heated and to be fed to the passenger space in the warmed-up condition; a line in communication with the liquid jacket of the internal combustion engine is thereby provided which includes a circulating pump and a heater apparatus whereby this line terminates in the heater circulatory system upstream of the control member controlling the quantity of flow through the adjoining heat-exchanger; a closure valve is also arranged in the heater circulatory system upstream of the place where this line terminates which prevents a return flow of the heated-up cooling liquid during standstill heater operation in by-passing relationship to the heat-exchanger.

18 Claims, 3 Drawing Figures

U.S. Patent
April 19, 1977
4,018,380

… … …

HEATER FOR VEHICLES

The present invention relates to a standstill heater system for vehicles, i.e., a heater system capable of operating even with the engine turned off, especially for motor vehicles with a liquid-cooled internal combustion engine and a regulatable heater circulation having at least one heat-exchanger traversed by air, from which the heated-up air is fed to the passenger space.

Different types of standstill heating systems are already known in the art in which cooling liquid is heated in a heater apparatus. This heated-up liquid is then used for the warm-up of the internal combustion engine so that, as a rule, a heating-up of the passenger space is achieved only in a secondary role. The known installations are, for the most part, very expensive and are therefore little suited for subsequent installation into an already existing motor vehicle.

The aim of the present invention especially consists of providing under avoidance of the indicated disadvantages of the known constructions, a standstill heater which is adapted to be interconnected in a simple manner into an already existing heater circulation and which gives off the available heat primarily for heating the passenger space.

Consequently, a standstill heating system for vehicles, especially motor vehicles, with a liquid-cooled internal combustion engine and a controllable heating circulation having at least one heat-exchanger traversed by air is proposed, from which the heated-up air is fed to the passenger space, whereby according to the present invention a line in communication with the cooling-liquid jacket of the internal combustion engine is provided, in the course of which are interconnected a circulating pump and a heater apparatus, whereby the line terminates in the heater circulatory system upstream of the control member controlling the through-flow quantity through the adjoining heat-exchanger, and whereby additionally a closure valve is arranged in the heater circulatory system upstream of the terminating place of the line, which during the standstill heating operation prevents a backflow of the heated-up cooling liquid in by-passing relationship to the heat-exchanger.

A large temperature drop is avoided and a uniform warm-up of the internal combustion engine during standstill heater operation is achieved if the line is led away from the lowest place of the cooling-liquid jacket of the internal combustion engine.

Already after a short period of time, heated-up cooling liquid with a large heat content is available if a thermostat controlling the flow from the liquid jacket of the internal combustion engine is arranged in the line, from which leads away a by-pass line extending in parallel to the circulating pump and to the heater apparatus.

In one preferred embodiment of the present invention, the thermostat includes a contact device which, during the first opening of the thermostat, turns on a blower or fan supplying the heat-exchanger preferably with recirculated air. The blower may thereby be engaged directly, however, the blower may be engaged also with a delay in particular with a longer feed line from the heater apparatus to the termination in the heater circulatory system so that already during the starting of the blower warmed-up air reaches the passenger space.

It is of advantage if the closure valve is constructed as check valve.

Accordingly, it is an object of the present invention to provide a standstill heater for vehicles, especially for motor vehicles, which eliminates by simple means the aforementioned shortcomings and drawbacks encountered in the prior art.

Another object of the present invention resides in a standstill heater for motor vehicles which serves primarily for heating the passenger space during standstill of the engine.

A further object of the present invention resides in a standstill heater system for motor vehicles which is relatively inexpensive and is particularly suited for installation into already existing motor vehicles.

Still a further object of the present invention resides in a standstill heating system of the aforementioned type which avoids an excessive temperature drop yet achieves a uniform heating of the internal combustion engine during engine-standstill heating operation.

Another object of the present invention resides in a heating system for vehicles, especially motor vehicles, which is able to make available already after a relatively short period of time heated-up cooling liquid with a large heat content even though the engine is still standing still.

Figure 2A:
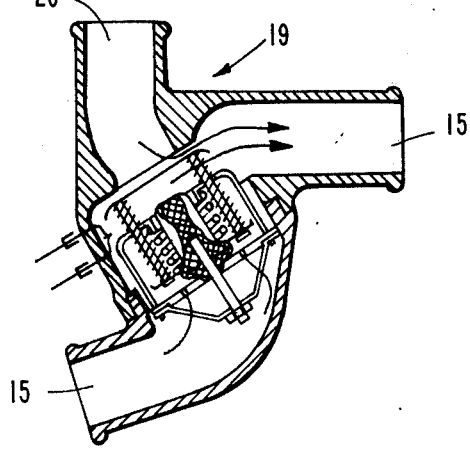
Figure 2B:
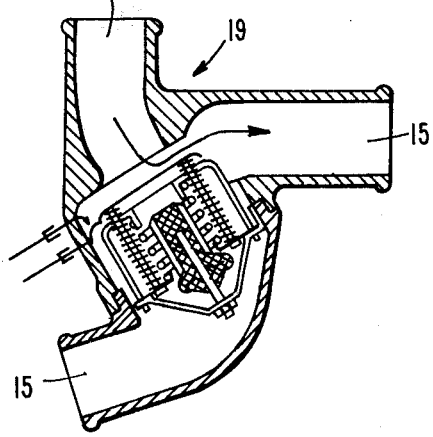

These and other objects, features and advantages of the present invention will become more apparent from the following description when taken in connection with the accompanying drawings which show, for purposes of illustration only, one embodiment in accordance with the present invention, and wherein:

FIG. 1 is a schematic view of a standstill heating system for motor vehicles in accordance with the present invention; and FIGS. 2A and 2B are schematic views showing the operation of the thermostatic valve 19 of FIG. 1.

Referring now to FIG. 1, an internal combustion engine 1 which is only schematically indicated, includes a cooling circulatory system generally designated by reference numeral 2, in the course of which are arranged a thermostat 3, a circulating device 4 and a radiator 5. During the warm-up phase of the internal combustion engine 1, warmed-up cooling liquid flows through a tap or take-off line 6 to the thermostat 3. The control mechanism of the thermostat 3, which responds only when the internal combustion engine has reached the operating temperature, closes the inlet to a line 7 leading to a radiator 5 so that by reason of the by-pass effect of the thermostat 3, the warmed-up cooling liquid passes over into a line 8, from which it is again fed back directly to the internal combustion engine 1 under the influence of the circulating device 4. If the internal combustion engine 1 has reached its operating temperature, then the thermostat 3 opens and the warm cooling liquid is directed to the line 7, cools off in the radiator 5 and again reaches the internal combustion engine by way of the line 8.

For purposes of warming-up the passenger space (not shown) a heating circulatory system generally designated by reference numeral 9 is present which includes an inlet or feed line 11 leading to a heat-exchanger 10 and a return line 12 terminating in the return line 8. By means of a control device 13 installed in the inlet line or feed line 11 and actuatable, for example, from the instrument panel, the quantity of flow to the heat-exchanger 10 can be varied.

In order to achieve a warm-up of the passenger space also when the internal combustion engine 1 is turned off or stands still, a heater apparatus 14 operated, for example, by means of liquid fuel and of any conventional type, is interconnected in a line 15 which is in communication with the lowest place of the liquid jacket of the internal combustion engine 1 and which terminates in the feed line 11 upstream of the control member 13. A circulating pump 16 installed into the line 15 provides the necessary feed or supply flow which is prevented from a direct return flow to the internal combustion engine 1 by a closure valve 18 constructed as check valve 17. In the illustrated embodiment of the present invention, additionally a thermostat 19 is provided in the line 15, from which leads away a line 20 in parallel with the circulating pump 16 and the heater apparatus 14.

During standstill heater operation, which may be initiated manually or also by means of a timer mechanism, at first cooling liquid circulates, as indicated in dash arrows, in the closed loop formed by lines 15 and 20 since the thermostat 19 is still closed, as shown in FIG. 2A, and consequently the section of the line 15 leading from the thermostat 19 to the circulating pump 16 is separated from the section of the line 15 disposed upstream of the thermostat 19 which connects the engine block 1 with the thermostat 19. The circulation of cooling liquid establishes itself necessarily because cooling water discharge in the direction of the heat exchanger 10 is not possible by reason of the counter pressure. Only when the cooling liquid is heated up by the heating apparatus 14 has reached a certain temperature, e.g., of about 60° C., the thermostat 19 commences to open, as shown in FIG. 2B, and a cooling liquid component is then able to flow-after out of the engine block 1. Though the circulation indicated in dash lines continues, a liquid circulation now establishes itself which—as indicated by the full line arrows—leads through the heat-exchanger 10 by way of the line 15 inclusive the heater 14. As a result thereof, no sudden separation or closing off of the by-pass line takes place as otherwise only cold cooling liquid would be sucked in by pump 16. The circulation shown by the full line arrows therefore comes into existence additionally whereby the thermostat 19 serves as mixing device in a conventional manner. For purposes of the rapid heat-up of the passenger space, a fan or blower generally designated by reference numeral 21 which is arranged in front of the heat-exchanger 10, is provided to recirculate air to the passenger space as shown by the arrows in FIG. 1, and which is engaged or turned on by a contact mechanism, illustrated in FIGS. 2A and 2B accommodated in the thermostat 19, when the thermostat 19 opens at first.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A standstill heating system for vehicles with a liquid-cooled internal combustion engine and a controllable heating circulatory system having at least one heat-exchanger means adapted to be traversed by air, the heated-up air being adapted to be fed from said heat-exchanger means to a passenger space, characterized in that a line means is provided which is in communication with the liquid jacket of the internal combustion engine and which includes a circulating pump means and a heater means providing a standstill heater operation independently of the operation of the internal combustion engine, said heating circulatory system including a control means controlling the quantity of flow through the adjoining heat-exchanger means, said line means terminating in said heating circulatory system upstream of said control means, and a closure valve means arranged in the circulatory system upstream of the place where said line means terminates in the heating circulatory system, said closure valve means preventing by-passing of the heat-exchanger means during standstill heater operation by a return flow of the heated-up cooling liquid to the internal combustion engine.

2. A standstill heating system according to claim 1, characterized in that the cooling-liquid jacket of the internal combustion engine has a lowest place, and the line means is led away substantially from the lowest place of the cooling-liquid jacket of the internal combustion engine.

3. A standstill heating system according to claim 2, characterized in that a thermostat means controlling the inflow from the cooling-liquid jacket of the internal combustion engine is arranged in the line means, a by-pass line which extends in parallel with respect to the circulating pump means and the heater means, leading away from said thermostat means.

4. A standstill heating system according to claim 3, characterized in that the thermostat means includes means which during the first opening of the thermostat means engages a fan means.

5. A standstill heating system according to claim 4, characterized in that said fan means supplies the heat-exchanger means with air.

6. A standstill heating system according to claim 5, characterized in that the air supplied by said fan means is substantially recirculated air from the passenger space.

7. A standstill heating system according to claim 5, characterized in that the closure valve means is constructed as check valve.

8. A standstill heating system according to claim 7, characterized in that the air supplied by said fan means is substantially recirculated air from the passenger space.

9. A standstill heating system according to claim 1, characterized in that a thermostat means controlling the inflow from the cooling-liquid jacket of the internal combustion engine is arranged in the line means, a by-pass line which extends in parallel with respect to the circulating pump means and the heater means, leading away from said thermostat means.

10. A standstill heating system according to claim 9, characterized in that the thermostat means includes means which during the first opening of the thermostat means engages a fan means.

11. A standstill heating system according to claim 10, characterized in that the air supplied by said fan means is substantially recirculated air from the passenger space.

12. A standstill heating system according to claim 1, characterized in that the closure valve means is constructed as check valve.

13. A standstill heating system according to claim 1, characterized in that the standstill heater operation is adapted to be provided when the internal combustion engine is turned-off.

14. In a heating system for vehicles with an internal combustion engine being cooled by circulatory liquid and a controllable heating circulatory system providing a heating cycle of said liquid, said heating circulatory system having at least one heat-exchanger means adapted to be traversed by air for supplying heated air during said heating cycle to a passenger space, and said heating circulatory system including control means arranged upstream and adjoining said heat-exchanger means for controlling the quantity of flow of said liquid through said heat-exchanger means, the improvement comprising means for providing said heating cycle of said heating circulatory system independently of operation of said internal combustion engine, wherein said means for independently providing said heating cycle includes line means for communicating the liquid jacket of said internal combustion engine with said heat-exchanger means, said line means terminating in said heating circulatory system upstream of said control means, and said line means including pump means for circulating said liquid, and heater means for heating said liquid independently of the operation of said internal combustion engine, and wherein said heating circulatory system includes valve means upstream of the termination of said line means with said heating circulatory system for preventing by-passing return flow of said liquid to said internal combustion engine with respect to said heat-exchanger means during operation of said heater means.

15. A heating system according to claim 14, wherein said line means further includes thermostat means for controlling inflow of said liquid to said pump means and second line means arranged to extend from said thermostat means in parallel with said pump means and said heater means for providing a circulation loop of said pump means, heater means, second line means and thermostat means.

16. A heating system according to claim 15, wherein said thermostat means includes means for controlling a fan means as a function of opening of said thermostat means.

17. A heating system according to claim 16, wherein said fan means supplies air to said heat-exchanger means.

18. In a heating system for vehicles with an internal combustion engine being cooled by circulatory liquid and a controllable heating circulatory system providing a heating cycle of said liquid, said heating circulatory system having at least one heat-exchanger means adapted to be traversed by air for supplying heated air during said heating cycle to a passenger space, and said heating circulatory system including control means arranged upstream and adjoining said heat-exchanger means for controlling the quantity of flow of said liquid through said heat-exchanger means, the improvement comprising means for providing said heating cycle of said heating circulatory system independently of operation of said internal combustion engine, wherein said means for independently providing said heating cycle includes line means for communicating the liquid jacket of said internal combustion engine with said heat-exchanger means, said line means terminating in said heating circulatory system upstream of said control means, and said line means including pump means for circulating said liquid, and heater means for heating said liquid independently of the operation of said internal combustion engine, and wherein said line means further includes thermostat means for controlling inflow of said liquid to said pump means and second line means arranged to extend from said thermostat means in parallel with said pump means and said heater means for providing a circulation loop of said pump means, heater means, second line means and thermostat means.

* * * * *